United States Patent [19]
Schreiber et al.

[11] Patent Number: 5,617,716
[45] Date of Patent: Apr. 8, 1997

[54] METHOD FOR SUPPLYING VAPORIZED FUEL OIL TO A GAS TURBINE COMBUSTOR AND SYSTEM FOR SAME

[75] Inventors: Henry Schreiber, San Carlos; Norman Stewart, San Jose, both of Calif.

[73] Assignee: Electric Power Research Institute, Palo Alto, Calif.

[21] Appl. No.: 307,999

[22] Filed: Sep. 16, 1994

[51] Int. Cl.⁶ .................................................. F02K 1/00
[52] U.S. Cl. ......................................... 60/39.05; 60/39.182
[58] Field of Search ......................... 60/39.05, 39.06, 60/39.182, 39.3, 39.53, 39.55, 39.461, 736, 737

[56] References Cited

U.S. PATENT DOCUMENTS

| | | | |
|---|---|---|---|
| 4,041,699 | 8/1977 | Schelp | 60/39.59 |
| 4,089,639 | 5/1978 | Reed et al. | |
| 4,313,300 | 2/1982 | Wilkes et al. | |
| 4,845,940 | 7/1989 | Beér | |
| 4,932,204 | 6/1990 | Pavel et al. | 60/736 |
| 4,948,055 | 8/1990 | Belcher et al. | 60/39.55 |
| 5,038,558 | 8/1991 | Sohma et al. | |
| 5,040,470 | 8/1991 | Lofton et al. | |
| 5,055,278 | 10/1991 | Reidick | |
| 5,058,374 | 10/1991 | Bechlher et al. | 60/39.55 |
| 5,067,419 | 11/1991 | Kobayashi et al. | |
| 5,095,693 | 3/1992 | Day | 60/39.05 |
| 5,193,346 | 3/1993 | Kuwata et al. | |
| 5,218,824 | 6/1993 | Cederwall et al. | |
| 5,228,283 | 7/1993 | Sciocchetti | 60/742 |
| 5,237,812 | 8/1993 | Mumford | |
| 5,249,535 | 10/1993 | Chung | |
| 5,259,342 | 11/1993 | Brady et al. | |
| 5,263,325 | 11/1993 | McVey et al. | |
| 5,357,746 | 10/1994 | Myers et al. | 60/736 |

FOREIGN PATENT DOCUMENTS 0125325  9/1980  Japan ........................... 60/736

*Primary Examiner*—Timothy S. Thorpe
*Attorney, Agent, or Firm*—Skjerven, Morrill, MacPherson, Franklin & Friel; David E. Steuber

[57] ABSTRACT

A method for supplying vaporized fuel oil to a gas turbine combustor. The method includes heating liquid fuel oil to a predetermined temperature below the carbonization temperature of the fuel oil to produce preheated liquid fuel oil. The preheated liquid fuel oil is atomized and then vaporized by direct contact with steam before being delivered to the gas turbine combustor. A system is provided for performing the method of the invention.

21 Claims, 1 Drawing Sheet

METHOD FOR SUPPLYING VAPORIZED FUEL OIL TO A GAS TURBINE COMBUSTOR AND SYSTEM FOR SAME

BRIEF DESCRIPTION OF THE INVENTION

This invention relates to methods and systems for delivering fuels to gas turbine combustors and more particularly to methods and systems for delivering vaporized fuel oil to gas turbine combustors.

BACKGROUND OF THE INVENTION

It is desirable to limit the production of $NO_x$ in fuel oil combustors. In the art of gas turbines, there is existing technology that achieves low $NO_x$ combustion by the lean premixing of gaseous fuel with air. One such technique produces a sufficiently dilute fuel/air mixture to reduce the rate of $NO_x$ formation below the rate which exists in a combustion zone having the stoichiometrically correct fuel/air ratio. In another technique disclosed in U.S. Pat. No. 4,089,639 issued May 18, 1978 to Reed et al., water vapor is premixed with a vaporized fuel prior to the burning operation to produce reduced levels of $NO_x$.

In order to produce a lean or dilute fuel/air mixture with fuel oil, the fuel oil must be in the form of a vapor intimately mixed with air, or with air and inerts, so that the ratio of available fuel oil to air and/or inerts is low. When such a vaporized fuel oil is utilized in a combustor, the mass of the air and/or inerts intimately mixed with and surrounding the fuel oil acts as a large heat sink at the molecular site of combustion. This heat sink absorbs the heat of combustion without raising the temperature of the combustion products and the air and inert substances intimately mixed with the combustion products beyond the point where rapid $NO_x$ formation occurs.

The challenge to achieving such a dilute mixture with fuel oil is that the oil is normally introduced into a gas turbine combustor as a finely divided or atomized spray of small droplets. The space around the oil spray is fuel-rich and there is not necessarily enough time for all the oil droplets to evaporate completely and/or mix uniformly with a large volume of air prior to initiation of combustion. The combustion taking place in this fuel-rich volume, particularly at the surface of unvaporized oil droplets and in the region where there is a fuel rich oil vapor to air mixture, is at or near the stoichiometrically correct air/fuel ratio and produces a corresponding local adiabatic flame temperature high enough to produce a rapid rate of thermal $NO_x$ formation. Unfortunately, attempting to pre-vaporize the fuel oil prior to its introduction into the combustor by providing its heat of vaporization from a heat source having a temperature high enough to cause oil carbonization, risks carbonization of the oil onto hot heat transfer surfaces or premature combustion of the liquid and/or vapor.

In some gas turbines burning oil, compressed air from atomizing air compressors provides the mechanical energy to break the liquid fuel oil up into small droplets at the fuel nozzle exit. Steam atomizers have been used in boilers to provide mechanical energy for breaking preheated heavy oil up into small droplets for introduction into the furnace of the boiler.

A heat source for pre-vaporization of fuel oil is required that has a high heat capacity and heat flux so as to produce a sufficiently high temperature for causing rapid and complete vaporization of an atomized oil spray, yet has a temperature sufficiently low so as to prevent carbonization of the fuel oil.

OBJECTS AND SUMMARY OF THE INVENTION

The primary object of the present invention is to provide a method and system for supplying vaporized fuel oil to the combustor of a gas turbine.

A more particular object of the invention is to provide a method and system of the above character in which the fuel oil is preheated to a temperature below its carbonization temperature to inhibit deleterious carbonizing and carbon buildup on hardware.

Another object of the invention is to provide a method and system of the above character in which the preheated fuel oil is atomized into a mixing chamber.

Another object of the invention is to provide a method and system of the above character in which the atomized fuel oil is further heated in the mixing chamber by direct contact with steam so as to be vaporized.

Another object of the invention is to provide a method and system of the above character in which the steam serves to dilute the fuel oil vapor to supplementally facilitate substoichiometric combustion with resultant low $NO_x$ production within the combustor of the gas turbine.

These and other objects are achieved by a method for supplying vaporized fuel oil to a gas turbine combustor. The method includes heating liquid fuel oil to a predetermined temperature below the carbonization temperature of the fuel oil to produce preheated liquid fuel oil. The preheated liquid fuel oil is atomized and then vaporized before being delivered to the gas turbine combustor. A system is provided for performing the method of the invention.

Additional objects and features of the invention will appear from the following description from which the preferred embodiment is set forth in detail in conjunction with the accompanying drawing.

DETAILED DESCRIPTION OF THE INVENTION

Figure 1:
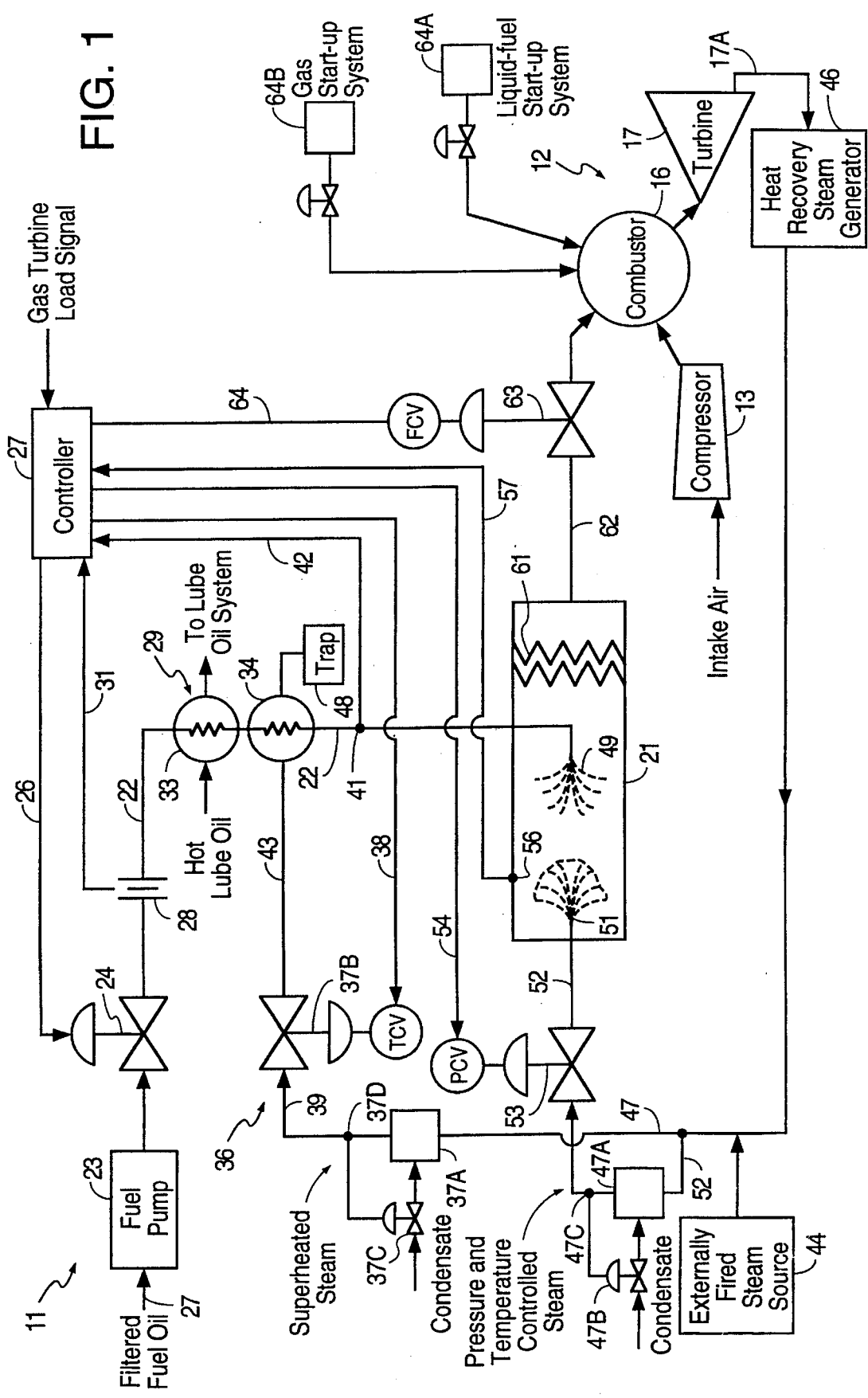
FIG. 1 is a schematic block flow diagram of the method for supplying fuel oil vapor to a gas turbine combustor in accordance with the present invention.

Reference will now be made in detail to the preferred embodiment of the invention which is illustrated in the accompanying figure. The description of the embodiment of the invention will be followed by a discussion of its operation.

FIG. 1 shows a fuel oil supply system 11 associated with a gas turbine system 12, which is configured to burn a gaseous fuel in a low $NO_x$ lean premix mode. Gas turbine system 12 has an intake air compressor 13 for delivering compressed air to one or more combustion chambers 16, one of which is shown in FIG. 1, which serve as combustors. Combustion chamber 16 delivers expandable combustion products to a turbine 17 of gas turbine system 12. Fuel oil supply system 11 provides vaporized fuel oil for the combustion process to combustion chamber 16. Combustion chamber 16 in turn delivers the combustion products to power the turbine 17.

Fuel oil supply system 11 includes a mixing and vaporizing chamber 21 into which pressurized, pre-heated liquid fuel oil is injected through a supply line 22. A flow of filtered liquid fuel oil is provided to supply line 22 and, as pressurized by a fuel pump 23, is regulated by a main gas turbine throttle or load control valve 24 to provide the fuel flow rate called for by the operating condition of gas turbine system 12. Load control valve 24 is controlled via a lead 26 by a gas turbine control system which includes a controller 27. Controller 27 responds to a gas turbine load signal from the gas turbine control system (not shown) and thereby supplies sufficient fuel oil to maintain a load (e.g., an electric power generator) operating at a desired rotational speed and output level. The flow rate of the pressurized fuel oil from load control valve 24 is measured by a fuel meter 28 before the pressurized fuel oil is heated by a preheater 29. Fuel meter 28 delivers a signal indicative of the flow rate to controller 27 over a lead 31.

Preheater 29 includes an optional lube oil-to-fuel oil heat exchanger 33 and a closed, higher temperature steam-to-fuel oil heat exchanger 34 connected in series for preheating the pressurized fuel oil prior to its injection into mixing and vaporizing chamber 21. Lube oil heat exchanger 33 is connected to a lube oil system (not shown) which provides a steady supply of hot lube oil for heating the pressurized fuel oil. It should be appreciated, however, that preheater 29 can be constructed without optional heat exchanger 33 and be within the new scope of the present invention. A thermocouple 41 is provided in supply line 22 downstream of preheater 29 for sensing the temperature of the preheated liquid fuel oil from the preheater. Thermocouple 41 delivers a signal to controller 27 by a lead 42.

Superheated steam controlled to a temperature of about 750° F. is provided to heat exchanger 34 by a steam supply system 36 which includes an attemperator 37A and a temperature-control valve (TCV) 37B, linked to controller 27 by a lead 38, for regulating the amount of steam provided to heat exchanger 34 through an input line 39. Attemperator 37A receives condensate (water) through a valve 37C and injects the condensate into the flow of superheated steam. A temperature sensor 37D downstream from attemperator 37A controls valve 37C to regulate the flow of condensate into attemperator 37A and thereby maintain the steam in line 39 at the desired temperature of about 750° F.

Steam supply system 36 includes a conventional externally fired steam generator 44 and/or a heat recovery steam generator 46 which is coupled to an exhaust duct 17A of turbine 17 for generating steam from the output gases of the turbine. The steam from generators 44 and/or 46 is delivered through a line 47 and attemperator 37A into input line 39 upstream of control valve 37B. The condensate formed by the transfer of energy from the steam to the pressurized fuel oil within heat exchanger 34 is collected in a trap 48 or in any other suitable condensate removal means.

The heated fuel oil from preheater 29 is injected into mixing and vaporizing chamber 21 through one or more atomizing nozzles 49, which are attached to the end of fuel supply line 22.

Means is included in fuel oil supply system 11 for introducing pressure and temperature controlled steam into mixing and vaporizing chamber 21 to vaporize the atomized fuel oil therein and includes one or more nozzles 51 connected to the end of a steam supply line 52. A pressure control valve (PCV) 53 is provided in supply line 52 for regulating the pressure in mixing and vaporizing chamber 21 at a relatively constant preset pressure. Pressure control valve 53 is controlled by controller 27 over a lead 54. The temperature of the steam upstream of pressure control valve 53 is controlled by an attemperator 47A, which injects condensate (water) into the superheated steam flowing in line 52. The flow of condensate into attemperator 47A is controlled by a valve 47B and a temperature sensor 47C in the same manner described above in connection with valve 37C and temperature sensor 37D. The steam and atomized fuel oil in mixing and vaporizing chamber 21, and all hardware in contact with liquid or vaporized fuel oil are maintained at a controlled temperature below the carbonization temperature of the fuel oil by steam jacketing and/or insulation (not shown). A transducer 56 is provided within mixing and vaporizing chamber 21 for sensing the pressure therein and is coupled to the controller by a lead 57. An optional static mixer 61 may be provided within mixing and vaporizing chamber 21 to ensure that a substantially uniform mixture of steam and vaporized fuel oil is provided to gas turbine system 12.

Means adapted to deliver vaporized fuel oil from mixing and vaporizing chamber 21 to combustion chamber 16 of gas turbine system 12 is provided and includes a line 62 and a flow control valve (FCV) 63 provided on line 62 and connected to controller 27 by a lead 64. Line 62 between mixing and vaporizing chamber 21 and combuster 16 is insulated and may be heat traced to prevent condensation of the steam and oil vapor mixture between mixing and vaporizing chamber 21 and combustor 16. Valve 63 is also insulated and may be heat traced to prevent condensation of the steam and oil vapor mixture within valve 63.

In operation and use, fuel oil supply system 11 provides a vaporized fuel oil for fueling gas turbine system 12. Start-up of the gas turbine system can be accomplished with standard oil fired diffusion flame fuel nozzles using liquid fuel from a liquid fuel source 64A if a gaseous start-up fuel is unavailable. If a gaseous start-up fuel is used, it is supplied by gaseous start-up system 64B. Then a gas-to-gas fuel transfer from the gaseous start-up fuel to the vaporized oil fuel can be made. Once operation of gas turbine system 12 is established on liquid fuel oil from source (64A), transfer to the lean premix vaporized oil from fuel oil supply system 11 can be accomplished in a manner similar to a switch from liquid to gas fuel in a lean premix combustor.

Preheater 29 serves to heat the pressurized liquid fuel oil to a predetermined temperature below approximately 900° F., the approximate carbonization temperature of the fuel oil. This temperature is in the range of the vaporization temperature of fuel oil under the pressure conditions within mixing and vaporizing chamber 21. More particularly, the preheater heats the pressurized liquid fuel oil to a temperature in the range of 750° F. (e.g., 700°–800° F.). In this regard, the superheated steam supplied by steam supply system 36 to steam heat exchanger 34 has a temperature in the range of 750° F. Thermocouple 41 senses the temperature of the heated fuel oil from the preheater 29, and a corresponding signal is transmitted through lead 42. Controller 27 serves to position temperature control valve 37B so as to maintain a constant preset fuel oil temperature of about 750° F. at the exit of fuel atomizing nozzle 49. Under steady state or loaded operating conditions, the heat to generate the steam of steam supply system 36 comes from the exhaust gases of turbine 17 via heat recovery steam generator 46 or, optionally, from externally fired steam source 44.

Fuel pump 23 pressurizes the fuel oil to a high enough pressure to prevent phase change in the liquid fuel oil as it travels between preheater 29 and atomizing nozzle 49. More specifically, the fuel oil is pressurized to a pressure sufficient to preclude vaporization of the preheated liquid fuel oil in supply line 22 prior to its injection into mixing and vaporizing chamber 21. The pressure of the preheated fuel oil, which for example should exceed 25 atmospheres, also provides adequate energy for mechanical atomization of the fuel oil by atomizing nozzle 49.

Atomizing nozzle 49 serves to reduce the preheated and pressurized liquid fuel oil from preheater 29 to a fine liquid spray as it is injected into mixing and vaporizing chamber 21. Mixing and vaporizing chamber 21 is sized and configured to permit turbulent flow conditions at a Reynolds number exceeding 3000, and a sufficient residence time of the oil/steam mixture to permit complete vaporization of the atomized oil droplets. Since the fuel oil from the preheater 29 enters mixing and vaporizing chamber 21 at a temperature below the carbonization temperature of the fuel oil, the fuel oil does not plate out onto surfaces, including the atomizing nozzle, thus preventing erosion, carbon buildup or other damage to the nozzle or other hardware within mixing and vaporizing chamber 21.

The pressure and temperature controlled steam from steam supply line 52 directly contacts the atomized fuel oil droplets within chamber 21 and thus serves to further heat and completely vaporize the fuel oil droplets. The steam from steam supply line 52 is created from boiler feedwater and has a temperature ranging from 750° F. to 850° F., preferably in the range of 800° F. to 850° F. The pressure of the steam within chamber 21 is sensed by pressure transducer 56 which delivers a representative signal to controller 27. Based on this signal, controller 27 operates pressure control valve 53 so as to maintain a constant preset pressure within the mixing and vaporizing chamber. This pressure is sufficient to permit complete vaporization of the atomized fuel oil within chamber 21 at a temperature ranging from approximately 750° F. to 850° F. while providing adequate pressure drop through fluid control valve 63 to produce good flow rate control of the vaporized fuel oil entering combustion chamber 16 of gas turbine system 12. The temperature within chamber 21 is maintained below the carbonization temperature of the fuel oil. As discussed above, optional static mixer 61 ensures that the fuel oil leaving the mixing and vaporizing chamber is in a substantially uniform steam/fuel vapor mixture.

The fuel vapor and steam mixture from mixing and vaporizing chamber 21 is delivered by line 62 into combustion chamber 16 of gas turbine system 12 for mixing and combusting with air therein. The vaporized oil from fuel oil supply system 11 is delivered to the inlet of combustion chamber 16 without further dilution with air. Once in the combustion system of gas turbine system 12, but still upstream of the portions of the combustion chamber where combustion occurs, the steam and oil vapor mixture may be mixed with dilution air to further reduce the mass ratio of oil vapor to the surrounding mixture of air and inerts.

The flow rate of the steam and oil vapor mixture entering gas turbine system 12 is regulated by controller 27. In general, the fuel flow signal from fuel meter 28 provides input to the controller which positions control valve 63 so as to correctly regulate the fuel vapor flow rate to combustion chamber 16. More specifically, controller 27 responds to changes in load demand (represented by the gas turbine load signal) by opening or closing load control valve 24. This action increases or decreases the liquid fuel flow from fuel pump 23 through fuel meter 28. Since liquid fuel is essentially incompressible, an increase in the flow rate through flow meter 28 is almost instantaneously accompanied by an increase in the liquid fuel flow rate through atomizing nozzle 49. Controller 27 uses the signal from flow meter 28 to regulate the opening and closing of fluid control valve 63 to provide the corresponding fuel vapor mass flow rate to combustion chamber 16. The schematic control system described herein has been simplified for clarity and is intended to show only the functional relationships of the fuel delivery components. As appreciated by those skilled in the art, many other operating parameters in addition to those described herein are monitored and employed to generate output signals to the control valves of system 11.

The fuel-lean mixture of oil vapor, water vapor and air entering the combustion zone of combustion chamber 16, which includes the vaporized fuel oil from system 11 of the present invention, burns with a substoichiometric adiabatic flame temperature in the combustion chamber which is low enough to prevent formation of significant thermal $NO_x$. The chief diluent in low $NO_x$ gas turbine system 12 is excess air intimately mixed with the fuel oil in the premixing chamber (not shown) of the gas turbine combustor. Nonetheless, the steam from nozzle 51 also serves to dilute the fuel prior to combustion and thus supplementally contributes to the substoichiometric combustion conditions. The use of steam at a high partial pressure as a heat source to vaporize the atomized fuel oil and as a heat sink and diluent during combustion of the vaporized fuel oil mixture prevents fuel pre-ignition by reducing flame propagation speed and also prevents the formation of post ignition thermal NOx. In this regard, the pressure of the steam provided to mixing and vaporizing chamber 21 through steam supply line 52 is controlled by pressure control valve 53 to facilitate controlled flow of the steam and oil vapor mixture to the combustion chamber.

The presence of the steam in the steam and fuel oil vapor mixture performs useful work in gas turbine system 12. More specifically, the steam joins the combustion products leaving combustion chamber 16 and entering turbine 17. The steam, upon which air compressor 13 has performed no work of compression, expands through the turbine and produces additional power at an improved engine efficiency.

From the foregoing, it can be seen that a method and system for supplying vaporized fuel oil to the combustor of a gas turbine has been provided. The fuel oil is preheated to a temperature below its carbonization temperature and prevented from contacting any surface above the carbonization temperature of the fuel oil to inhibit deleterious carbonizing and carbon deposition on the hardware. The preheated fuel oil is atomized into a mixing chamber for further heating by direct contact with steam so as to become vaporized. The steam that vaporizes the fuel oil supplementally serves to further dilute the fuel oil and thus contributes to substoichiometric combustion for facilitating a low $NO_x$ formation rate during the combustion process of the gas turbine engine.

We claim:

1. A method for supplying vaporized fuel oil to a gas turbine combustor comprising the steps of heating a liquid fuel oil to a predetermined temperature to produce preheated liquid fuel oil, atomizing the preheated liquid fuel oil to produce atomized liquid fuel oil, introducing a controlled amount of steam to completely vaporize the atomized liquid fuel oil and thereby produce a mixture of steam and vaporized fuel oil, and delivering the mixture of steam and vaporized fuel oil to the gas turbine combustor, wherein the temperature of the liquid fuel oil is maintained below the carbonization temperature thereof.

2. The method of claim 1 wherein the vaporizing step includes supplying additional heat to the atomized liquid fuel oil.

3. The method of claim 2 wherein the vaporizing step includes supplying steam to the atomized liquid fuel oil.

4. The method of claim 3 wherein the vaporizing step includes supplying steam having a temperature ranging from 750° F. to 850° F.

5. The method of claim 3 wherein the vaporizing step includes controlling the amount of steam supplied so that the atomized liquid fuel oil is completely vaporized.

6. The method of claim 3 wherein the vaporizing step includes creating a turbulent flow of the steam and atomized liquid fuel oil at a Reynolds number exceeding 3000.

7. The method of claim 2 wherein the vaporizing step includes controlling the pressure of the atomized liquid fuel oil to permit complete vaporization of the atomized liquid fuel oil at a temperature ranging from 750° F. to 850° F.

8. The method of claim 1 further comprising the step of pressurizing the liquid fuel oil.

9. The method of claim 8 wherein the pressurizing step includes pressurizing the liquid fuel oil to a pressure sufficient to preclude vaporization of the preheated liquid fuel oil prior to atomization and to cause atomization of the preheated liquid fuel oil.

10. The method of claim 7 wherein the pressurizing step includes pressurizing the liquid fuel oil so that the preheated liquid fuel oil has a pressure exceeding 25 atmospheres.

11. The method of claim 1 wherein the heating step includes heating the liquid fuel oil to a temperature in the range of from 700° F. to 800° F.

12. The method of claim 1 wherein the heating step includes heating the liquid fuel oil to approximately 750° F.

13. A method for providing fuel oil vapor to a gas turbine combustor comprising the steps of heating a liquid fuel oil to a temperature in the range of 750° F. but below the carbonization temperature of the liquid fuel oil to produce preheated liquid fuel oil, directing the preheated liquid fuel oil through an atomizing nozzle to produce atomized liquid fuel oil, heating the atomized liquid fuel oil by mixing the atomized liquid fuel oil with steam to produce a vaporized fuel oil and steam mixture and delivering the vaporized fuel oil and steam mixture to the gas turbine combustor.

14. The method of claim 13 wherein the heating step includes heating the atomized liquid fuel oil by contact with steam having a temperature ranging from 750° F. to 850° F.

15. The method of claim 14 further comprising the step of pressurizing the liquid fuel oil so that the preheated liquid fuel oil has a pressure exceeding 25 atmospheres.

16. A system to vaporize liquid fuel oil for use with a gas turbine combustor comprising a mixing chamber, a preheater for heating liquid fuel oil, an atomizing nozzle coupled to the preheater for introducing atomized liquid fuel oil into the mixing chamber, a line for introducing steam into the chamber to vaporize the atomized liquid fuel oil, a first means for controlling the temperature of the steam in said line, a second means for controlling the temperature of the fuel in said atomizing nozzle, and a controller linked to said first and second means, wherein said controller is programmed to control said steam temperature and said fuel temperature and said mixing chamber is sized and configured such that said fuel oil is completely vaporized in said mixing chamber without allowing the temperature of said liquid fuel oil to exceed the carbonization temperature thereof.

17. The system of claim 16 wherein the chamber includes a static mixer to improve mixing of the steam and vaporized fuel oil.

18. The system of claim 16 wherein the preheater includes a heat exchanger and wherein the apparatus further comprises a heat recovery steam generator coupled to the gas turbine exhaust duct for supplying steam to the heat exchanger.

19. The system of claim 16 wherein the preheater is adapted to heat the liquid fuel oil to a temperature below the carbonization temperature of the liquid fuel oil.

20. A process for preparing fuel oil for injection into the combustor of a gas turbine engine, said process comprising the steps of pumping said fuel oil in liquid form through a first supply line, passing said fuel oil through a heat exchanger so as to heat said fuel oil, directing said fuel oil to a mixing and vaporizing chamber, atomizing said fuel oil in said mixing and vaporizing chamber, introducing steam to said mixing and vaporizing chamber so as to completely vaporize said fuel oil, and directing said fuel oil in gaseous form through a second supply line to said combustor, said process being controlled such that no surface of said first or second supply lines, said heat exchanger, or said mixing and vaporizing chamber with which said fuel oil comes into contact is at a temperature above the carbonization temperature of said fuel oil.

21. A method for supplying vaporized fuel oil to a natural gas fuel delivery manifold of a lean premix dry low $NO_x$ gas turbine combustor comprising the steps of heating the liquid fuel oil to a predetermined temperature to produce a non-carbonized preheated liquid fuel oil, atomizing the preheated liquid fuel oil to produce atomized liquid fuel oil, using steam to add heat of vaporization to the atomized fuel oil to completely vaporize the atomized fuel oil and thereby produce vaporized fuel oil, and delivering the vaporized fuel oil to an inlet of the natural gas fuel delivery manifold of the gas turbine combustor.

* * * * *